(12) United States Patent  (10) Patent No.: US 7,870,224 B1
Maigatter  (45) Date of Patent: Jan. 11, 2011

(54) MANAGING ONLINE COMPOSITE IMAGE CONTENT

(75) Inventor: Mark John Maigatter, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 884 days.

(21) Appl. No.: 11/760,548

(22) Filed: Jun. 8, 2007

(51) Int. Cl.
G06F 15/16 (2006.01)
(52) U.S. Cl. .................................... 709/217
(58) Field of Classification Search ................ 709/217, 709/201, 232, 246; 707/501
See application file for complete search history.

(56) References Cited

U.S. PATENT DOCUMENTS

| | | | | |
|---|---|---|---|---|
| 5,327,265 A * | 7/1994 | McDonald | .................. | 358/527 |
| 5,440,401 A | 8/1995 | Parulski et al. | ............. | 358/342 |
| 6,035,323 A * | 3/2000 | Narayen et al. | ............ | 709/201 |
| 6,332,146 B1 | 12/2001 | Jebens et al. | ................ | 707/104 |
| 6,483,602 B1 * | 11/2002 | Haneda | ...................... | 358/1.16 |
| 6,545,687 B2 * | 4/2003 | Scott et al. | .................. | 345/629 |
| 6,549,660 B1 * | 4/2003 | Lipson et al. | ............... | 382/224 |
| 6,564,225 B1 | 5/2003 | Brogliatti et al. | ......... | 707/104.1 |
| 6,738,798 B1 * | 5/2004 | Ploetz et al. | ................ | 709/203 |
| 6,757,684 B2 * | 6/2004 | Svendsen et al. | .................... | 1/1 |
| 7,180,618 B2 * | 2/2007 | Ueda et al. | ................ | 358/1.15 |
| 7,202,839 B2 * | 4/2007 | Gormish | ..................... | 345/2.1 |
| 7,225,158 B2 * | 5/2007 | Toshikage et al. | ............. | 705/51 |
| 7,237,185 B1 * | 6/2007 | Sequeira | ..................... | 715/209 |
| 7,487,155 B2 * | 2/2009 | Jebens et al. | ....................... | 1/1 |
| 2007/0250539 A1 * | 10/2007 | Montgomery | ............ | 707/104.1 |
| 2008/0133697 A1 * | 6/2008 | Stewart et al. | ............. | 709/217 |
| 2008/0168134 A1 * | 7/2008 | Goodman et al. | ........... | 709/204 |
| 2008/0215964 A1 * | 9/2008 | Abrams et al. | ............. | 715/246 |
| 2008/0235600 A1 * | 9/2008 | Harper et al. | ............... | 715/748 |

* cited by examiner

*Primary Examiner*—Krisna Lim
(74) *Attorney, Agent, or Firm*—Fish & Richardson P.C.

(57) ABSTRACT

A method includes receiving an upload request to retrieve a master image. The method further includes retrieving the master image in response to the upload request. The method also includes storing the retrieved master image. The method further includes generating a composite image file using the retrieved master image. The composite image file can be used to create a plurality of images derived from the master image.

27 Claims, 3 Drawing Sheets

US 7,870,224 B1

MANAGING ONLINE COMPOSITE IMAGE CONTENT

BACKGROUND

The present disclosure relates to the field of Internet content management, and more specifically to a system and method for managing and distributing composite image content. The use of images in marketing and advertising on the Internet has become central to companies' online strategies. For example, a clothing retailer may want to make available in an online catalog their products and images so that potential buyers may browse selections without coming into a physical store. Some businesses may not have a physical storefront and rely solely on their online presence, in which case displaying their inventory online is crucial. Some vendors literally have thousands of products whose images need to be managed. Image creation, preparation, and deployment for multiple distribution channels requires intensive manual labor, high fixed costs, and additional network infrastructure. Often this results in slower product time-to-market and under-utilization of images.

SUMMARY

In general, in one aspect, embodiments of the invention feature a method that includes receiving an upload request to retrieve a master image. That method also includes retrieving the master image in response to the upload request, storing the retrieved master image, and generating a composite image file using the retrieved master image. The composite image file can be used to create a plurality of images derived from the master image. Other embodiments of this aspect include corresponding systems, apparatus, and computer program products.

These and other embodiments can optionally include one or more of the following features. The upload request can include a file name. The upload request can be communicated using the Simple Object Access Protocol (SOAP). The upload request can be a request to upload a plurality of images. The upload request can include a uniform resource identifier for the master image. The master image can be stored in a content management system. The composite image file can be a multi-resolution image file. A response to the upload request can be sent. The composite image file can be published to an image, rendering, or web server.

Particular embodiments of the subject matter described in this specification can be implemented to realize one or more of the following advantages. Instead of creating and storing multiple versions and formats of a particular image, a composite image file may be used to derive the multiple versions and formats upon request. This may reduce the total amount of required storage space by eliminating the need to store each version and format for each image. The reduction in the number of managed images may reduce image distribution time and the costs associated with image distribution. Automatically generating composite image files from master images may also streamline image processing and may make image quality consistent across images.

The details of one or more embodiments of the invention are set forth in the accompanying drawings and the description below. Other features, aspects, and advantages of the invention will become apparent from the description, the drawings, and the claims.

DETAILED DESCRIPTION

Usually, when displaying online products, a thumbnail image, a mid-sized image, and sometimes large-scale image of a particular product are created. To allow customers to access the images when viewing a particular product, all three types of images for the product typically need to be manually uploaded into a content delivery system, and sometimes manually published onto web or image servers. As an alternative, a composite image file, such as a multi-resolution image file, may be created instead of creating three distinct image files. Among other things, a multi-resolution file combines multiple resolutions of a given image into a single file, which is easier to manage than three distinct image files and more flexible in that it makes possible derivation of images at resolutions that are not pre-defined. In accordance with the present subject matter, a multi-resolution file may be generated automatically upon uploading a master image. The multi-resolution image file may then be published to image servers, which can derive on demand an image of a specified resolution. A customer accessing a product's webpage may then receive from the image server an image derived from the multi-resolution image file at virtually any resolution less than the master image. A composite image file does not have to be a single computer file, but may be a collection of data files.

Figure 1:
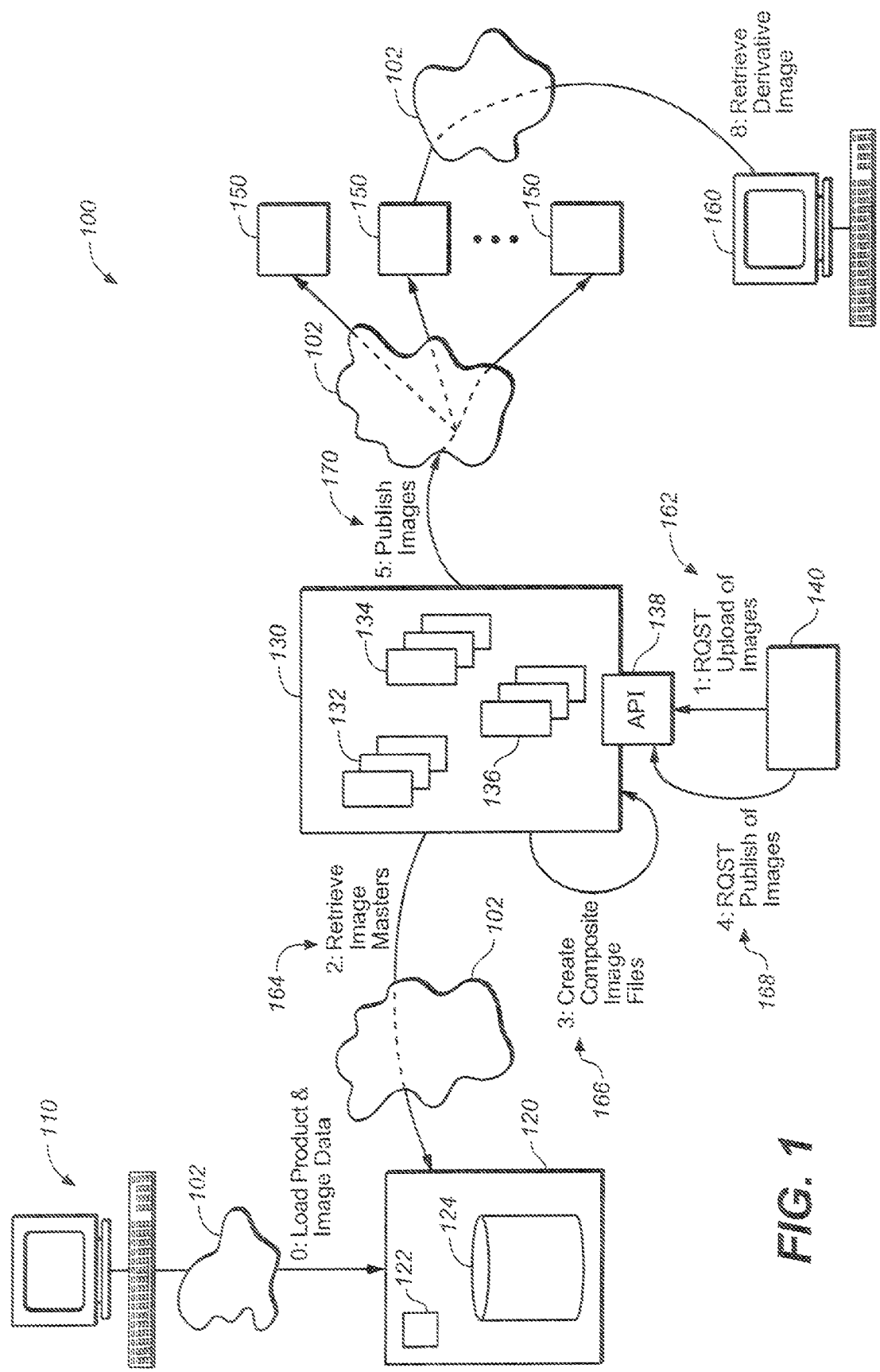
FIG. 1 is a block diagram of an image management system.

As shown in FIG. 1, composite image management system 100 contains, among other things, a network 102, a content delivery network 120 and an image production system 130. Generally, upon receiving a request transmitted over network 102, the image production system 130 may upload (at 164) master images 124 stored on the content delivery network 120, may create (at 166) composite image files 132, and may publish (at 170) the composite image files 132 to one or more image servers 150. Once published, a customer 160 may request an image having specified attributes, such as an image for a certain product having a particular resolution. An image server 150 may then dynamically derive from a composite image file 132 an image having the specified attributes and send the derived image to the customer 160.

A network 102 is a collection of nodes capable of directing communications from a first computing device connected on the network to a second computing device connected on the network. The span of a network 102 may be local, connecting only computing devices sharing the same physical office space (e.g., a local area network), or wide, connecting computing devices over long distances (e.g., a wide area network). A network 102 may be connected to another network 102. One example of a network 102 is the Internet, which is a global network 102 connecting millions of computing devices. One or more of the networks 102 shown in FIG. 1 may be communicatively coupled another network 102.

The client 110 may be one or more digital computing devices capable of communicating over a network 102 and may have memory capacity sufficient to store one or more master images 124 and related product metadata before communicating them over the network 102. Generally, a client 110 may be operated by an online vendor or any entity that can create image content to be ultimately accessible over a network 102, such as the Internet.

The content delivery network 120, in this example, is a network of digital computing devices, having memory sufficient to store internet content, such as master images 124 and related product metadata. The nodes of a content delivery network 120, which include one or more computing devices, are generally deployed in multiple locations over multiple Internet backbones. These nodes cooperatively satisfy requests for content by end users, transparently redistributing content to optimize the delivery process. The number of nodes making up as content delivery network 120 varies, depending on the architecture, some reaching thousands of nodes with tens of thousands of computing devices. Requests for content are intelligently directed to the nodes based on location, available processing resources, and the like.

The image production system 130 includes one or more networked digital computing devices having a processor 134 and memory 136 sufficient to store master images 124 and composite image files 132. The image production system 130 provides services to create, manage, and/or publish image content using the image production system 130, as may be defined in an application programming interface (API) 138. These services may be accessed remotely and may be implemented using Web services, Java Remote Method invocation, the Common Object Request Broker Architecture, or any other network communications protocol or standard that facilitates interaction of applications running on more than one computing device.

An API 138 is a set of computer software services having pre-defined input and output parameters. The API 138 may also facilitate the invoking of the functionality described by the API 138 by a remote computing device. Two functions that may be present in some implementations are a request to upload images 162 and a request to publish the images 168. The request to upload images 162 may have as one of its inputs a universal resource identifier (URI) of a master image 124 that is to be uploaded. The request to upload images 162 may also have as an input a name to be given the composite image file 132 that is created from the master image 124. For example, a product's Stock Keeping Unit (SKU) identifier may be used to in referencing the image. The request to upload images 162 may include the URIs for multiple master images 124, as well as corresponding names to be given to the corresponding composite image files 132 that are created from the master images 124. An output of the request to upload images 162 may be an identifier of the job associated with the request, which can be used to query whether the image processing system 130 has completed the request. Another output of the request to upload images 162 may be a list of tails that describes where the composite image files 132 may be located for later access. In some implementations, the output parameter may specify that the job is complete or indicate the job's percentage of completion.

The request to publish images 168, which may be combined with the request to upload images 162, may also have a variety of parameters independent of or in combination with the parameters defined in the request to upload images 162. For example, the request to publish images 168 may have as an input the name of the company on whose behalf the publish request 168 is made, and/or one or more names of the composite image files 132 that are to be published. The request to publish images 168 may also have as an input an indicator as to whether to publish only new images uploaded since the last publish request 168, or whether to publish all of the all of the images associated with a certain company. Numerous variations are possible in the parameters passed to, in the parameters returned from, and in the names given to the services defined by the API 138. As indicated above, the API 138 may be implemented as a Web service.

A Web service is a software system designed to support interoperable machine-to-machine interaction over a network without human intervention. It has an interface described in a format that can be processed by a computing device. Remote computing devices interact with a Web service according to the described interface using the Simple Object Access Protocol (SOAP) messages, typically transmitted using the Hypertext Transfer Protocol (HTTP) with an Extensible Markup Language (XML) serialization along with other Internet standards. SOAP message is constructed on the client side, which contains all of the request information needed for the server to fulfill the requested function. A returning SOAP message is sent back containing result information. As one example, Apache Axis, available from The Apache Software Foundation, of Forest Hill, Md., may be used as a proxy servlet for the SOAP services allowing the client side messages to be constructed at a higher level of abstraction than if the SOAP messages had been constructed from scratch, Axis may be used on the client side to provide wrapper functions for many of the details required to construct a SOAP request.

These two software functions and any other function of the image processing system 130 may be implemented using any combination of software programming languages, standards, and protocols, whether they be proprietary or public.

A composite image file 132 is one or more digital files containing imaging data from which a variety of derived images may be generated. A composite image file 132 may be a multi-resolution image file, having a format such as the pyramid encoded Tagged Image File Format (VHF) or Eastman Kodak Company's FlashPix™. Multi-resolution image files are created from a master image 124 by scaling down the master image 124 multiple times at decreasing resolutions and combining into a single file the scaled down images. In some embodiments, one or more of the composite image files 132 are multi-resolution image files. The processor may be operable to generate the composite image files 132 from the master images 124. The process of generating a composite image file 132 involves scaling a master image at various resolutions and combining the various resolutions into a single file, as described in more detail below. In addition to multi-resolution image files, a composite image file 132 may be any digital file that contains information regarding various attributes, such as textures and colors, from which multiple images may be derived.

User 140 is a digital computing device with a processor and a memory and/or may include one or more human operators interacting with a digital computing device. User 140 is operable to send requests to the image production system 130 to create, manage, and publish composite image files 132. User 140 may also manage and edit the master images 124 through the API 138. User 140 may integrate the process of uploading and publishing with other automated processes. For example, the initial creation and/or storing of a master image file 124 may trigger the upload and/or publish requests 162 and 168. User 140 may structure requests to conform with the formats described by the API 138.

An image server 150 is a digital computing device having memory sufficient to store one or more composite image files 132. An image server 150 is connected to a network 102 and may receive published composite image files 132. An image server 150 may also generate and transmit images derived from a composite image file 132 upon receiving a request for an image having certain attributes, such as requests for certain formats (e.g., JPEG, TIF, PNG, and PDF) and/or for certain color conversions (CMYK for print or RGB or web). For composite image files 132 that are multi-resolution image files, the image server 150 may receive a request for a particular resolution. If the resolution is not one of the resolutions stored in the multi-resolution image file, the image server 150 may derive an image based on interpolation of the resolutions already contained with the multi-resolution file. The various techniques of interpolation are known to those skilled in the art.

In operation, the master images 124 and its related metadata may be pre-loaded in the content delivery network 120. An image processing system 130 may receive a request to upload images 162, and the request may contain a list of master images 124. Next, the image processing system 130 may pull (at 164) the master images 124 stored on the content delivery network 120 and store the master images 124 (e.g., in a local storage device). After the master images are uploaded, the image processing system 130 may create (at 166) composite image files 132 and store the composite image files 132 as well. After receiving a request to publish images 168, the image processing system 130 may transmit (at 170) the composite image files 132 to one or more image servers 150. In some implementations, there is no need for a separate request to publish 168, and the composite images 132 are published (at 170) after they are created (at 166). Once published, a customer 160 may request an image having certain attributes, such as an image for a certain product having a particular resolution. An image server 150 may then dynamically derive from a composite image file 132 an image having the certain attributes and send the derived image to the customer 160.

For example, a major furniture retailer that plans to sell products via the Internet may have hundreds of products photographed for display online. Digital versions of the photographed products along with pricing information and other data may be loaded from client 110 to a content delivery network 120 via a network 102. The major furniture retailer may partner with an Internet retailer to display the products on the Internet retailer's web site. The Internet retailer may have a user 140 that receives a message indicating that the furniture retailer's photographs are available on the content delivery network 120. The user 140 may then initiate an application that will cause the photographs to be uploaded and published onto the Internet retailer's web site. To do so, the user 140 may create a request to upload the images 162 specifying certain parameters as indicated in the API 138, such as the URIs of the photographs stored in the content delivery system 120 and the name of the furniture retailer.

At this point, the image processing system 130 may receive the upload request 162 and retrieve (at 164) from the content delivery network 120 the master images 124 using the URIs provided in the upload request 162. For each master image 124, the image processing system 130 may generate (at 166) a composite image file 132 and store it for later publishing. In some implementations, the generation and/or the storing of the composite image file 132 may be done automatically in response to the uploading of the master images. Once all of the master images 124 are uploaded and processed, the image processing system 130 may transmit a message to the user 140 indicating the completion of the job. After receiving an indication that the job is complete, the user 140 may send a request to publish images 168, indicating within the request the name of the furniture retailer and an indication that all of the images should be published. After receiving the publish request 168, the image processing system 130 may transmit (at 170) to the image servers 150, which may be connected to the Internet, the composite image files 132 associated with the furniture company. Upon completing the publishing job, the image processing system 130 may respond back to the user 140 with a message indicating, that the publish job is complete and also indicating a list of URIs associated with the newly published composite image files 132 as they reside on the image servers 150.

Figure 2:
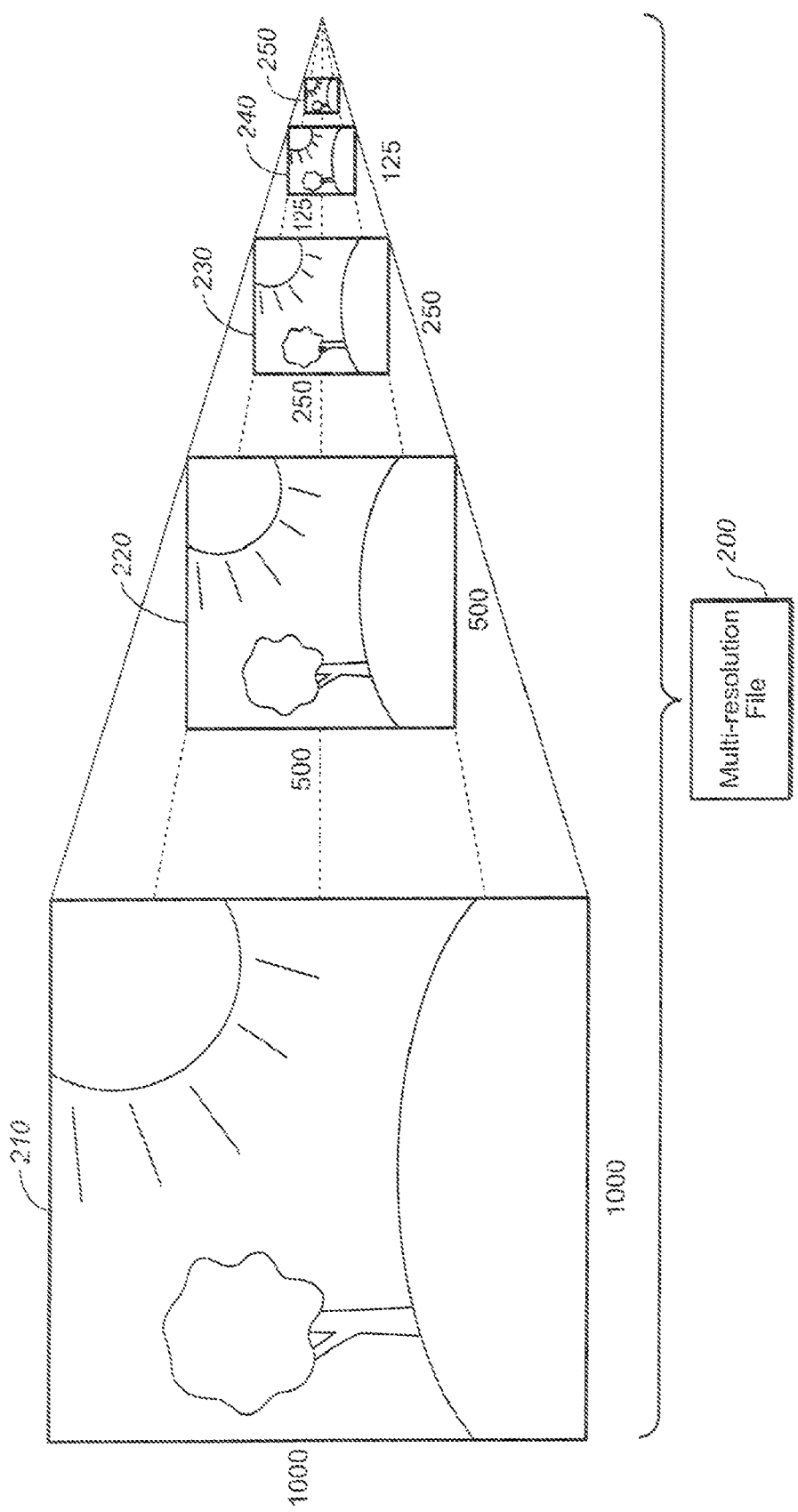
FIG. 2 is a conceptual depiction of a multi-resolution image file.

FIG. 2 is a simplified depiction of an example multi-resolution image file 200. The image file 200 may be created from a master image file having a resolution of 2400×2400 pixels. In this example, the highest resolution of the multi-resolution image file 200 may be 1000×1000 pixels, as demonstrated by the first image 210. The second image 220 in the multi-resolution image file 200 may be half the resolution of the first image 210, which in this case may be 500×500 pixels. The third image 230 may be half the resolution of the second image 220. There may be several images at decreasing resolution contained within the multi-resolution image file 200.

Figure 3:
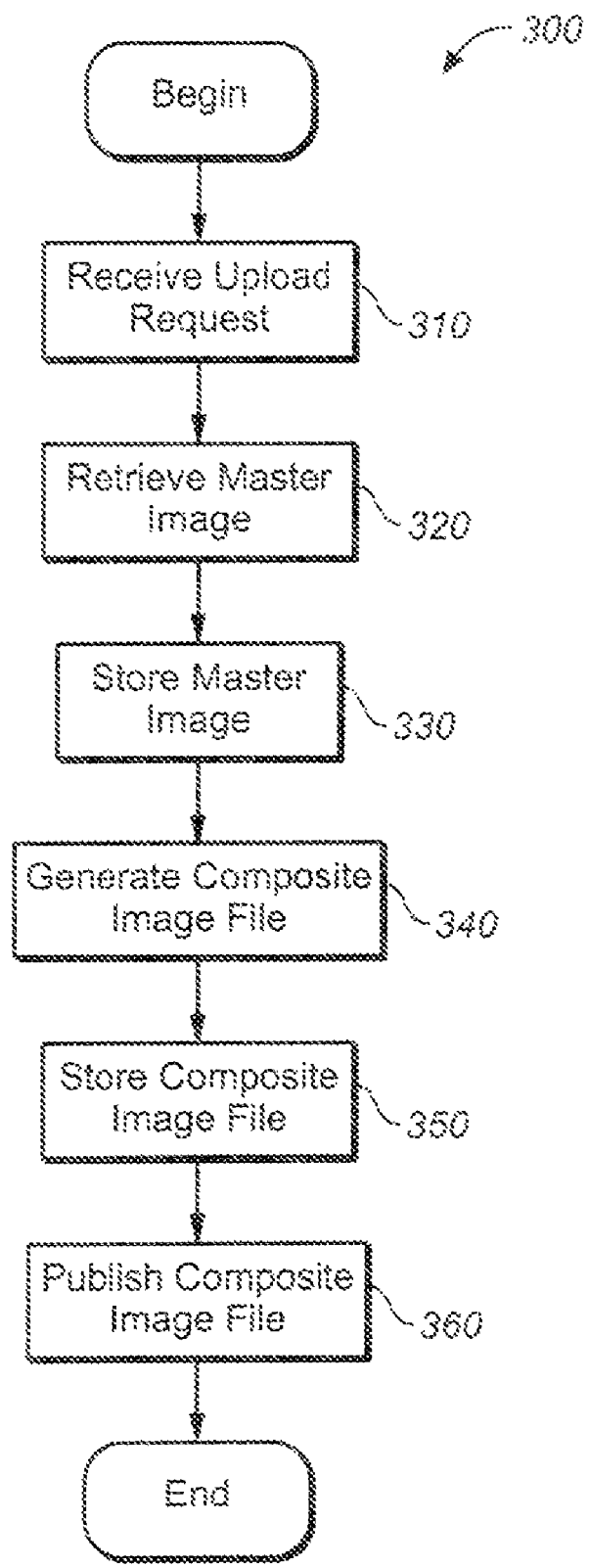
FIG. 3 is a flow chart illustrating a method for managing online composite image content.
Like reference numbers and designations in the various drawings indicate like elements.

FIG. 3 is a flow chart illustrating a process 300 for managing online composite image content. Generally, process 300 involves automatically uploading an image and publishing a composite image file based on that image. At step 310, an upload request is received. The upload request may contain a URI for a master image. Many other parameters may be included in the upload request. At step 320, the master image specified in the upload request may be retrieved. This master image may be retrieved from a content delivery network or directly from creator of the image. At step 330, the master image is stored, and at step 340, a composite image file may be generated using the master image. At step 350, the composite image file is stored, and at step 360, the composite image file is published. The composite image file need not be implemented as one physical file, but can be implemented in multiple physical files.

The subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted, languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple, coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-erect, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    receiving an upload request to retrieve a master image, wherein the first upload request is received through a first application programming interface and includes a parameter identifying a location of the master image;
    retrieving the master image in response to the upload request using the identified location;
    storing the retrieved master image on an image production server;
    generating a composite image file using the retrieved master image, wherein the composite image file includes data that can be used to create a plurality of images derived from the master image;
    receiving a request for a particular image having particular attributes; and
    dynamically generating an image having the particular attributes using the composite image file in response to the request for the particular image.

2. The method of claim 1 wherein the upload request comprises a name for referencing the composite image file.

3. The method of claim 1 wherein the upload request is communicated using the Simple Object Access Protocol (SOAP).

4. The method of claim 1 wherein the master image is stored in a content delivery network having a plurality of geographically distributed computers storing content for retrieval by client devices.

5. The method of claim 1 wherein the composite image file comprises a multi-resolution image file containing a plurality of scaled images of the master image.

6. The method of claim 5 wherein the plurality of scaled images comprises:
   a first scaled image that is half the resolution of the master image; and
   a second scaled image that is half the resolution of the first scaled image.

7. The method of claim 1 further comprising:
   publishing the composite image file to at least one server where the at least one server is selected from the group consisting of: an image server, a rendering server adapted to render images, and a web server.

8. The method of claim 7 further comprising transmitting a response to the upload request after processing the upload request.

9. The method of claim 8 wherein the response comprises a uniform resource identifier related to the published composite image file or an indication that the upload completed successfully.

10. A computer program product, encoded on a non-transitory computer-readable medium, operable to cause data processing apparatus to perform operations comprising:
    receiving an upload request to retrieve a master image, wherein the first upload request is received through a first application programming interface and includes a parameter identifying a location of the master image;
    retrieving the master image in response to the upload request using the identified location;
    storing the retrieved master image;
    generating a composite image file using the retrieved master image, wherein the composite image file includes data that can be used to create a plurality of images derived from the master image;
    receiving a request for a particular image having particular attributes; and
    dynamically generating an image having the particular attributes using the composite image file in response to the request for the particular image.

11. The product of claim 10 wherein the upload request further comprises a file name for referencing the composite image file.

12. The product of claim 10 wherein the upload request is communicated using SOAP.

13. The product of claim 10 wherein the master image is uploaded from a content delivery network having a plurality of geographically distributed computers storing content for retrieval by client devices.

14. The product of claim 10 wherein the composite image file comprises a multi-resolution image file containing a plurality of scaled images of the master image.

15. The product of claim 14 wherein the plurality of scaled images comprises:
    a first scaled image that is half the resolution of the master image; and
    a second scaled image that is half the resolution of the first scaled image.

16. The product of claim 10 further operable to cause data processing apparatus to perform operations comprising publishing the composite image file to at least one server where the at least one server is selected from the group consisting of: an image server, a rendering server adapted to render images, and a web server.

17. The product of claim 16 further comprising transmitting a response to the upload request after processing the upload request.

18. The product of claim 17 wherein the response comprises a uniform resource identifier related to the published composite image file.

19. A system comprising:
    a first server operable to:
        receive an upload request to upload a master image, wherein the first upload request is received through a first application programming interface and includes a parameter identifying a location of the master image;
        retrieve the master image in response to the upload request using the identified location;
        store the retrieved master image in memory;
        generate a composite image file using the retrieved master image, wherein the composite image file includes data that can be used to dynamically create a plurality of images derived from the master image, with each image having particular attributes identified in a request for the particular image; and
    a memory communicatively coupled to the first server operable to store the retrieved master image.

20. The system of claim 19 further comprising one or more computers operable to interact with the server and to send the upload request.

21. The system of claim 19 further comprising a second server operable to interact with the first server and to:
    receive the composite image file; and
    derive a plurality of images from the composite image file; and
    wherein the first server is adapted to publish the composite image file to the second server.

22. A computer-based application programming interface (API) system for managing image content implemented in a computing device comprising:
    a first API function for requesting to upload an image, the first API function comprising an input parameter for locating a master image to be uploaded; and
    a second API function for requesting to publish a composite image file created from the master image, the second API function comprising an input parameter for identifying the composite image file to be published.

23. The system of claim 22, where the input parameter for locating the master image comprises a uniform resource identifier.

24. The system of claim 22, where the first API function further comprises an input parameter for a name to be assigned to a composite image file created from the master image.

25. The system of claim 22, where the second API function further comprises an output parameter for locating the published composite image.

26. The system of claim 22, where the input parameter for identifying the composite image to be published comprises a name of a company on whose behalf the composite image is to be published.

27. The system of claim 22 further comprising a third API function selected from one of the group consisting of:
    a function for retrieving metadata associated with the uploaded master image;
    a function for retrieving a history of published composite image files;

a function for retrieving a status of a job associated with uploading a master image;

a function for retrieving details of a job associated with uploading a master image;

a function for retrieving a list of active jobs; and a function for stopping a job.